United States Patent
Taneya et al.

(10) Patent No.: US 9,689,520 B2
(45) Date of Patent: Jun. 27, 2017

(54) PIPE JOINT

(71) Applicant: SMC KABUSHIKI KAISHA, Chiyoda-ku (JP)

(72) Inventors: Yoshimoto Taneya, Koshigaya (JP); Taku Tomita, Katsushika-ku (JP); Shuichi Saito, Tsukubamirai (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 141 days.

(21) Appl. No.: 14/412,732

(22) PCT Filed: Jul. 1, 2013

(86) PCT No.: PCT/JP2013/068012
§ 371 (c)(1),
(2) Date: Jan. 5, 2015

(87) PCT Pub. No.: WO2014/010453
PCT Pub. Date: Jan. 16, 2014

(65) Prior Publication Data
US 2015/0159799 A1 Jun. 11, 2015

(30) Foreign Application Priority Data

Jul. 13, 2012 (JP) .................... 2012-158035

(51) Int. Cl.
*F15D 1/02* (2006.01)
*F16L 55/027* (2006.01)
(Continued)

(52) U.S. Cl.
CPC ...... *F16L 55/02718* (2013.01); *F15B 15/204* (2013.01); *F15B 21/003* (2013.01);
(Continued)

(58) Field of Classification Search
USPC ..................................... 138/43, 46
See application file for complete search history.

(56) References Cited

U.S. PATENT DOCUMENTS 1,617,614 A * 2/1927 York ............... E21B 34/02
138/46
1,682,602 A * 8/1928 Dawley ............. G01F 1/372
137/513.3
(Continued)

FOREIGN PATENT DOCUMENTS

DE 36 03 721 A1 3/1987
DE 197 02 173 C1 4/1998
(Continued)

OTHER PUBLICATIONS

Office Action issued May 5, 2016 in Chinese Patent Application No. 201380037452.0 (with English translation).
(Continued)

Primary Examiner — James Hook
(74) Attorney, Agent, or Firm — Oblon, McClelland, Maier & Neustadt, L.L.P.

(57) ABSTRACT

A pipe joint has a tube for fluid detachably fitted thereto, and is connected to a hydraulic device such as a cylinder. The pipe joint is provided with a resin body into which the tube for fluid is inserted, and a metal body which can rotate relative to the resin body. The resin body comprises orifices which each have a different opening diameter, and, as a result of the rotation of the resin body relative to the metal body, the orifices can be disposed in a connection part providing a connection path between the tube for fluid and the hydraulic device.

2 Claims, 19 Drawing Sheets

(51) Int. Cl.

| | |
|---|---|
| *F16L 37/091* | (2006.01) |
| *F16D 48/02* | (2006.01) |
| *F15B 15/20* | (2006.01) |
| *F15B 21/00* | (2006.01) |
| *F16L 29/00* | (2006.01) |

(52) U.S. Cl.
CPC .............. *F16D 48/02* (2013.01); *F16L 29/00* (2013.01); *F16L 37/091* (2013.01); *F16L 37/0915* (2016.05); *F16L 55/027* (2013.01); *F16D 2048/0215* (2013.01); *F16D 2048/0224* (2013.01)

(56) References Cited

U.S. PATENT DOCUMENTS

| | | | | |
|---|---|---|---|---|
| 3,148,703 | A * | 9/1964 | Kachline | G05D 16/18 137/884 |
| 3,286,731 | A * | 11/1966 | Zajac | F16K 47/02 137/556 |
| 4,011,893 | A * | 3/1977 | Bentley | A01G 25/023 138/42 |
| 4,195,631 | A * | 4/1980 | Baucom | A61M 1/3693 137/625.15 |
| 4,738,665 | A * | 4/1988 | Shepard | A61M 5/16881 137/1 |
| 4,796,924 | A | 1/1989 | Kosugi et al. | |
| 4,822,344 | A * | 4/1989 | O'Boyle | A61M 5/16881 604/246 |
| 4,909,490 | A * | 3/1990 | de Fontenay | F16F 13/262 138/30 |
| 5,176,360 | A * | 1/1993 | Winchell | A61M 5/141 138/43 |
| 5,287,891 | A * | 2/1994 | Bourlon | F16L 55/027 138/40 |
| 5,323,773 | A | 6/1994 | Kobayashi | |
| 5,722,696 | A | 3/1998 | Taneya | |
| 7,063,359 | B2 | 6/2006 | Vallee | |
| 8,801,045 | B2 | 8/2014 | Muto et al. | |
| 2003/0122372 | A1 | 7/2003 | Muto | |
| 2003/0173779 | A1 | 9/2003 | Ezura | |
| 2004/0070198 | A1 | 4/2004 | Rohrig | |
| 2004/0080161 | A1 | 4/2004 | Matsushita | |
| 2010/0122742 | A1 | 5/2010 | Lin | |
| 2011/0025054 | A1 | 2/2011 | Kluss | |
| 2011/0140417 | A1 | 6/2011 | Kluss | |
| 2012/0024398 | A1 | 2/2012 | Kannoo | |
| 2012/0217742 | A1 | 8/2012 | Furuya et al. | |
| 2012/0284980 | A1 | 11/2012 | Turnau, III | |
| 2015/0145248 | A1 | 5/2015 | Hagen et al. | |
| 2015/0337998 | A1 | 11/2015 | Hagen et al. | |

FOREIGN PATENT DOCUMENTS

| | | |
|---|---|---|
| DE | 101 54 588 A1 | 6/2002 |
| DE | 102 08 190 A1 | 8/2003 |
| DE | 20 2012 102 342 U1 | 10/2013 |
| DE | 20 2012 102 342 U1 | 11/2013 |
| EP | 0 268 251 A1 | 5/1988 |
| EP | 0 566 813 A1 | 10/1993 |
| EP | 2 949 984 A1 | 12/2015 |
| FR | 2 697 315 A1 | 4/1994 |
| FR | 2 830 071 A1 | 3/2003 |
| FR | 2 869 088 | 10/2005 |
| JP | 53-10436 | 1/1978 |
| JP | 57-53189 U | 3/1982 |
| JP | 59-147173 | 8/1984 |
| JP | 63-001990 U | 1/1988 |
| JP | 63-37896 U | 3/1988 |
| JP | 03-026891 U | 7/1989 |
| JP | 1-169697 U | 11/1989 |
| JP | 03-026891 U | 3/1991 |
| JP | 6-16183 A | 1/1994 |
| JP | 10-78165 | 3/1998 |
| JP | 2000-199503 | 7/2000 |
| JP | 2003-194283 A | 7/2003 |
| JP | 2003-254303 | 9/2003 |
| JP | 2004-11855 | 1/2004 |
| JP | 3593382 | 11/2004 |
| JP | 2008-217278 | 9/2008 |
| JP | 2011-33133 A | 2/2011 |
| JP | 2012-31877 | 2/2012 |
| WO | 96/30689 | 10/1996 |
| WO | 03/054434 A1 | 7/2003 |
| WO | 2009/150738 A1 | 12/2009 |
| WO | WO 2011/061947 A1 | 5/2011 |
| WO | 2014/072539 A1 | 5/2014 |

OTHER PUBLICATIONS

Korean Office Action issued Nov. 2, 2015 in Patent Application No. 10-2015-7004022 (with Partial English translation).
International Search Report issued Sep. 3, 2013, in PCT/JP2013/068012, filed Jul. 1, 2013.
German Office Action issued on Feb. 19, 2015 in Patent Application No. 11 2013 003 524.3 (without English Translation).
German Office Action issued on Mar. 19, 2015 in Patent Application No. 11 2013 003 519.7 (without English Translation).
Combined Office Action and Search Report issued on Oct. 9, 2015 in Chinese Patent Application No. 201380037452.0 with English translation.
Office Action issued on Oct. 21, 2015 in Korean Patent Application No. 10-2015-7004023 with partial English translation.
US Office Action issued in U.S. Appl. No. 14/412,724 on Oct. 21, 2016.
Japanese Office Action issued in Application No. 2014-524744 on Apr. 4, 2017 (w/ partial English translation).

* cited by examiner

PIPE JOINT

TECHNICAL FIELD

The present invention relates to a pipe joint for connecting a tube to a fluid pressure device.

BACKGROUND ART

With a fluid pressure device such as a cylinder or the like, for example, a piston, which is arranged in the interior of a cylinder tube, undergoes advancing and retracting movements in an axial direction of the cylinder tube under the action of a fluid pressure such as air pressure or hydraulic pressure, etc.

Heretofore, with a fluid pressure device, for controlling the velocity of the piston, various velocity control structures have been adopted. For example, a velocity control mechanism equipped cylinder is known, as disclosed in Japanese Laid-Open Patent Publication No. 2004-011855 (hereinafter referred to as conventional technique 1). In the cylinder, a cylinder chamber is provided, which is closed by a cover member, and a pressure fluid is supplied with respect to the cylinder chamber from a cylinder body having a pair of ports. A piston, which is displaced along an axial direction of the cylinder chamber, is installed internally in the cylinder body, and a piston rod is connected integrally to the piston.

The cylinder includes a cylindrical body, which is arranged in the interior of the cylinder body, and is connected to the cover member substantially in parallel with the piston rod. A shaft member, which can be inserted through the interior of the cylindrical body, is connected substantially in parallel in the interior of the piston rod. The cylinder comprises a first cutout groove, which is formed along the axial direction on an outer circumferential surface of the cylindrical body, and a second cutout groove, which is formed along the axial direction along the outer circumferential surface of the shaft member. Furthermore, the cylinder comprises a first seal member that surrounds the outer circumferential surface of the cylindrical body, and a second seal member that surrounds the outer circumferential surface of the shaft member.

In addition, when the outer circumferential surface of the cylindrical body is surrounded by the first seal member, the flow rate of a pressure fluid that flows between a port and the cylinder chamber is controlled by the first cutout groove. In addition or alternatively thereto, when the outer circumferential surface of the shaft member is surrounded by the second seal member, the flow rate of the pressure fluid that flows between a port and the cylinder chamber is controlled by the second cutout groove.

SUMMARY OF INVENTION

With the aforementioned conventional technique 1, the velocity control mechanism is assembled in the interior of the cylinder body. Therefore, there is a concern that the structure thereof will be made complex, and that compactness of the cylinder in its entirety cannot easily be achieved.

On the other hand, a structure is adopted in which a threaded portion is formed on the circumferential surface of the cylinder body, and a velocity control valve, for example a needle valve, is attached by means of the threaded portion. However, with such a needled valve, a handle is provided for the purpose of rotating the needle, and a mistaken operation or malfunctioning of the handle may be caused by mistaken contact with the handle. Additionally, it is easy for differences in operating conditions for the handle to take place when the handle is operated by each of different operators, leading to a risk of variance in the velocity conditions.

The present invention has been devised in consideration of the aforementioned problems, and has the object of providing a pipe joint that enables desired velocity conditions to be set easily and reliably, together with favorably improving operability.

The present invention relates to a pipe joint that is connected to a fluid pressure device, comprising a body in which a tube is inserted, and an attachment/detachment mechanism disposed in the interior of the body and which is configured to attach and detach the tube. In the body, an orifice part through which the tube and the fluid pressure device communicate is disposed rotatably. In addition, the opening dimension of an orifice of the orifice part that communicates with a communicating portion between the tube and the fluid pressure device can be changed by a rotational angular position thereof.

Further, in the pipe joint, the body comprises a first body in which the tube is inserted, and a second body connected to the fluid pressure device and which is rotatable relatively with respect to the first body. In the first body, the orifice part is formed integrally therewith, and in the orifice part, a plurality of orifices the opening diameters of which differ from each other respectively are disposed at equal intervals and have predetermined angles from one another respectively from a center of rotation of the first body. On the other hand, in the second body, preferably, a passage member is disposed having a through hole therein by which the orifices, which are arranged in specified angular positions, communicate with the fluid pressure device.

In the pipe joint, a groove and a projection, which maintain a plurality of specified angular positions of the first body and the second body by mutual engagement therebetween, may be disposed on an outer circumference or an inner circumference of the first body and on an inner circumference or an outer circumference of the second body.

Further still, in the pipe joint, the orifice part may comprise a main body portion installed in the body and in which a passageway that communicates with the communicating portion is offset from an axial center position. The orifice part may further comprise an orifice plate that engages rotatably with the main body portion, and in which an opening dimension of an orifice, which communicates with the passageway, can be changed intermittently or continuously depending on the rotational angular position thereof.

Further, in the pipe joint, a groove and a projection, which maintain a plurality of specified angular positions of the main body portion and the orifice plate by mutual engagement therebetween, may be disposed on the main body portion and the orifice plate.

According to the present invention, velocity control of the fluid pressure device can be accomplished easily and reliably under the operation of the orifice that is provided in the orifice part.

In particular, the opening dimension of an orifice of the orifice part that communicates with a communicating portion between the tube and the fluid pressure device can be changed by a rotational angular position thereof. Therefore, various types of fluid pressure devices can suitably be employed, and an improvement in versatility can easily be achieved.

The above and other objects, features and advantages of the present invention will become more apparent from the following description when taken in conjunction with the accompanying drawings, in which preferred embodiments of the present invention are shown by way of illustrative example.

DESCRIPTION OF EMBODIMENTS

Figure 1:
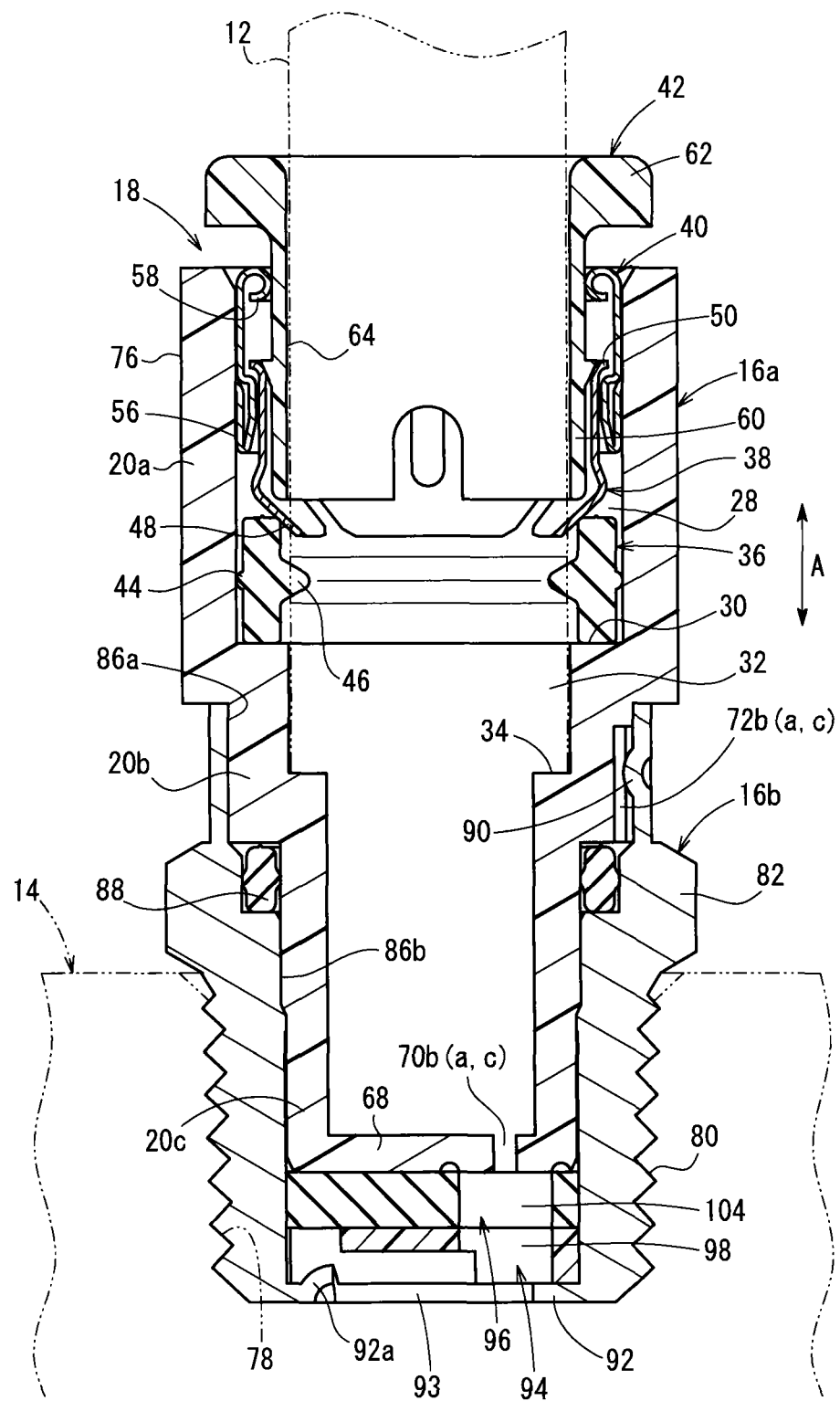
FIG. 1 is an overall vertical cross sectional view of a pipe joint according to a first embodiment of the present invention.

As shown in FIG. 1, in the pipe joint 10 according to a first embodiment of the present invention, a fluid tube 12 is mounted detachably, and the pipe joint 10 is connected, for example, to a fluid pressure device 14 such as a cylinder or the like.

Figure 2:
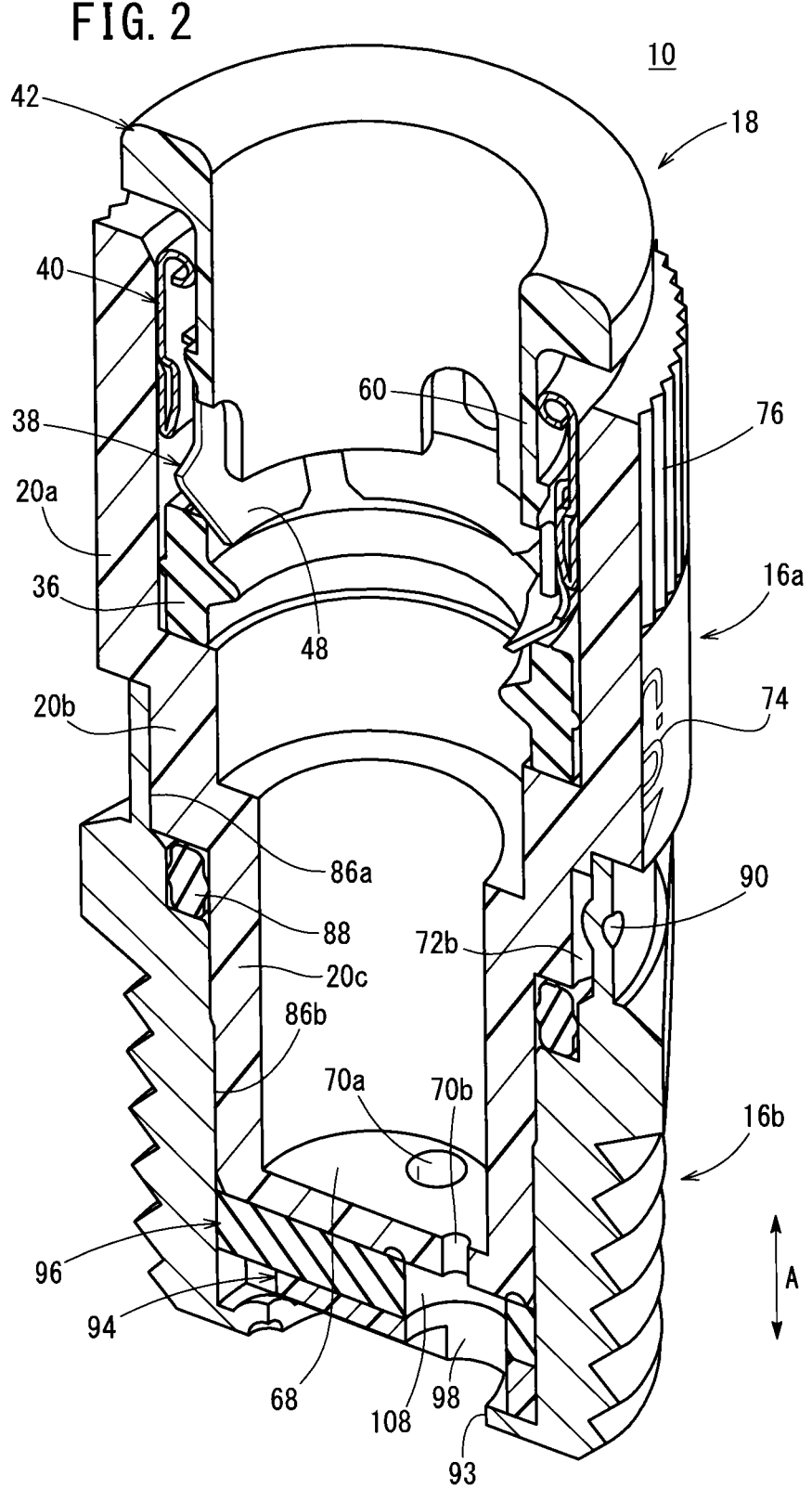
FIG. 2 is a cross sectional perspective view of the pipe joint.

As shown in FIGS. 1 and 2, the pipe joint 10 is equipped with a resin body (first body) 16a in which the fluid tube 12 is inserted, and a metal body (second body) 16b, which is connected to the fluid pressure device 14 and is rotatable relatively with respect to the resin body 16a.

The resin body 16a includes a large diameter cylindrical section 20a in which an attachment/detachment mechanism 18 is incorporated. An intermediate cylindrical section 20b, which is smaller in diameter than the large diameter cylindrical section 20a, is formed integrally with the large diameter cylindrical section 20a, and a bottomed cylindrical section 20c, which is smaller in diameter than the intermediate cylindrical section 20b, is formed integrally with the intermediate cylindrical section 20b.

A first opening 28 is formed at a predetermined depth in the axial direction in the interior of the large diameter cylindrical section 20a. A first stepped portion 30 is disposed at the bottom of the first opening 28, and the first opening 28 communicates through the first stepped portion 30 with a second opening 32, which is reduced in diameter. The second opening 32 is disposed in the interior of the intermediate cylindrical section 20b and has a predetermined depth, and a second stepped portion 34 is disposed at the bottom of the second opening 32.

Figure 3:
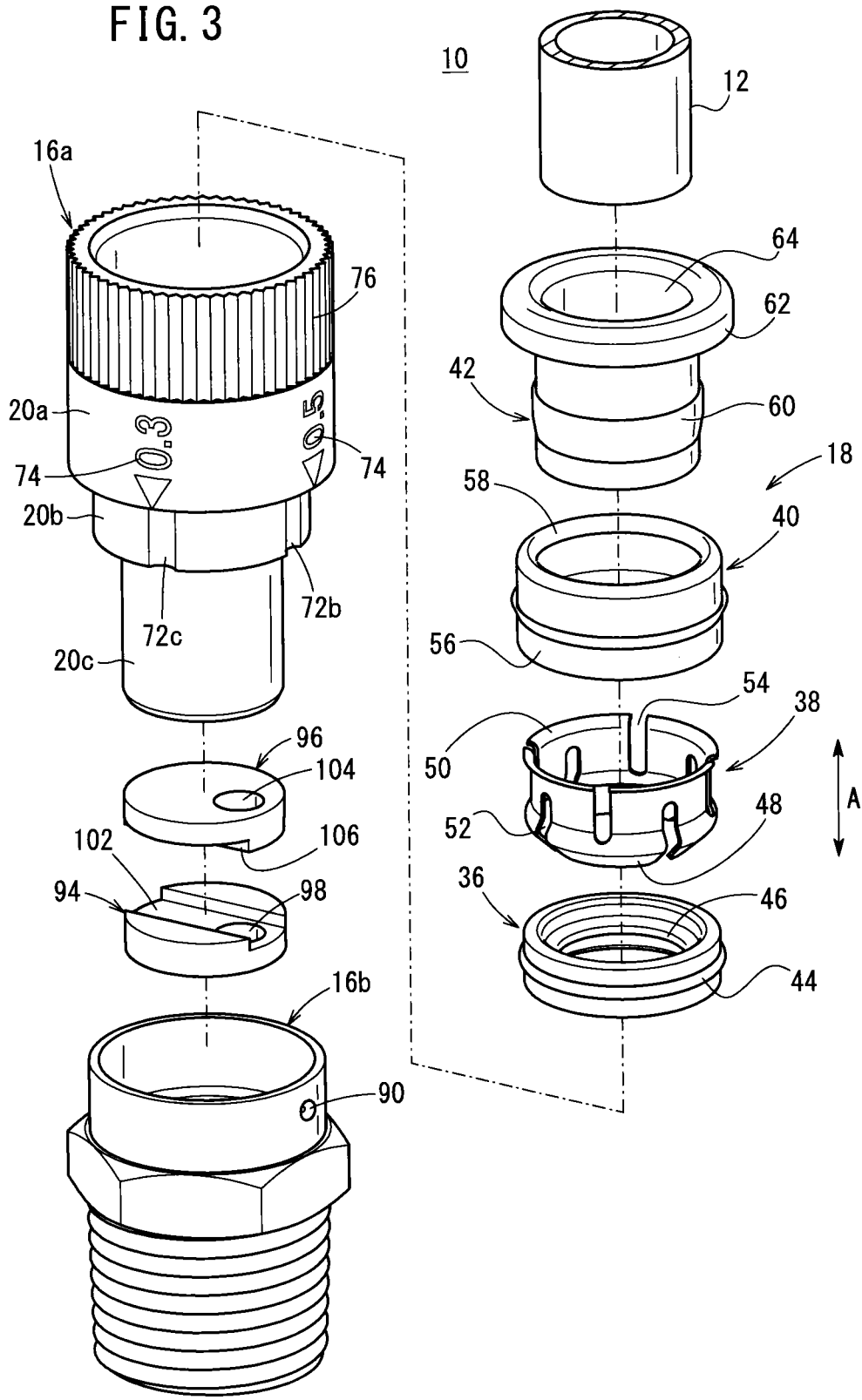
FIG. 3 is an exploded perspective view as seen from one direction of the pipe joint.

As shown in FIGS. 1 through 3, the attachment/detachment mechanism 18, which is incorporated in the first opening 28, is equipped with an annular packing member 36, and a chuck 38 that seizes the fluid tube 12 that is inserted into the resin body 16a. The attachment/detachment mechanism 18 comprises a guide member 40 engaged with an inner circumferential surface of the first opening 28, and a release bush 42 that is displaceable along the guide member 40.

The packing member 36, for example, is formed from an elastic material such as rubber or the like, and is arranged to abut against the first stepped portion 30 in the interior of the first opening 28. The packing member 36 is formed in a substantially ring-like shape, and on an outer circumferential surface thereof, a bulging portion 44 is formed, which abuts against the inner circumferential surface of the first opening 28. On an inner circumferential surface thereof, a seal projection part 46 is formed to project in sliding contact with the outer circumferential surface of the fluid tube 12.

The chuck 38 is formed in a substantially cylindrical shape, for example, by press working a thin plate material. Pawls 48, which are inclined radially inward, are formed on one end of the chuck 38, and latching members 50, which are bent radially outward, are formed on the other end of the chuck 38. Ends of the pawls 48 are formed in a blade-like shape, so as to be capable of biting into the outer circumferential surface of the fluid tube 12.

On one end side of the chuck 38, first slits 52 are formed, which are notched at a predetermined depth toward the other end side. The first slits 52 are disposed in a plurality (e.g., four) at equal intervals in the circumferential direction of the chuck 38.

On the other end side of the chuck 38, second slits 54 are formed, which are notched at a predetermined depth toward the one end side. The second slits 54 are disposed in a plurality (e.g., four) at equal intervals in the circumferential direction of the chuck 38. The first slits 52 and the second slits 54 are disposed alternately at different locations mutually along the circumferential direction of the chuck 38.

The guide member 40, similar to the aforementioned chuck 38, is formed in a substantially cylindrical shape, for example, by press working a thin plate material, and is arranged to abut against the inner circumferential surface of the first opening 28. On one end of the guide member 40, a front end portion 56 is formed, which is folded back at the inside of the first opening 28, and is arranged on the side of the packing member 36. On the other end of the guide member 40, a rear end portion 58 is formed, which is arranged at the open end of the first opening 28, and is bent and curved radially inward with a circular shape in cross section.

The release bush 42, for example, is formed in a cylindrical shape from a resin material. On one end of the release bush 42, a tapered part 60 is formed, which bulges radially outward and gradually reduces in diameter toward the distal end side. The tapered part 60 is disposed in facing relation to the pawls 48 that make up the chuck 38.

On the other end of the release bush 42, a flange 62 is formed that is expanded in diameter radially outward. The outside diameter of the flange 62 is greater than the diameter of the first opening 28. On the inside of the release bush 42, a through hole 64 through which the fluid tube 12 is inserted is formed to penetrate in the axial direction. The inside diameter of the through hole 64 is formed at a substantially constant diameter, which is slightly greater than the outside diameter of the fluid tube 12.

Figure 4:
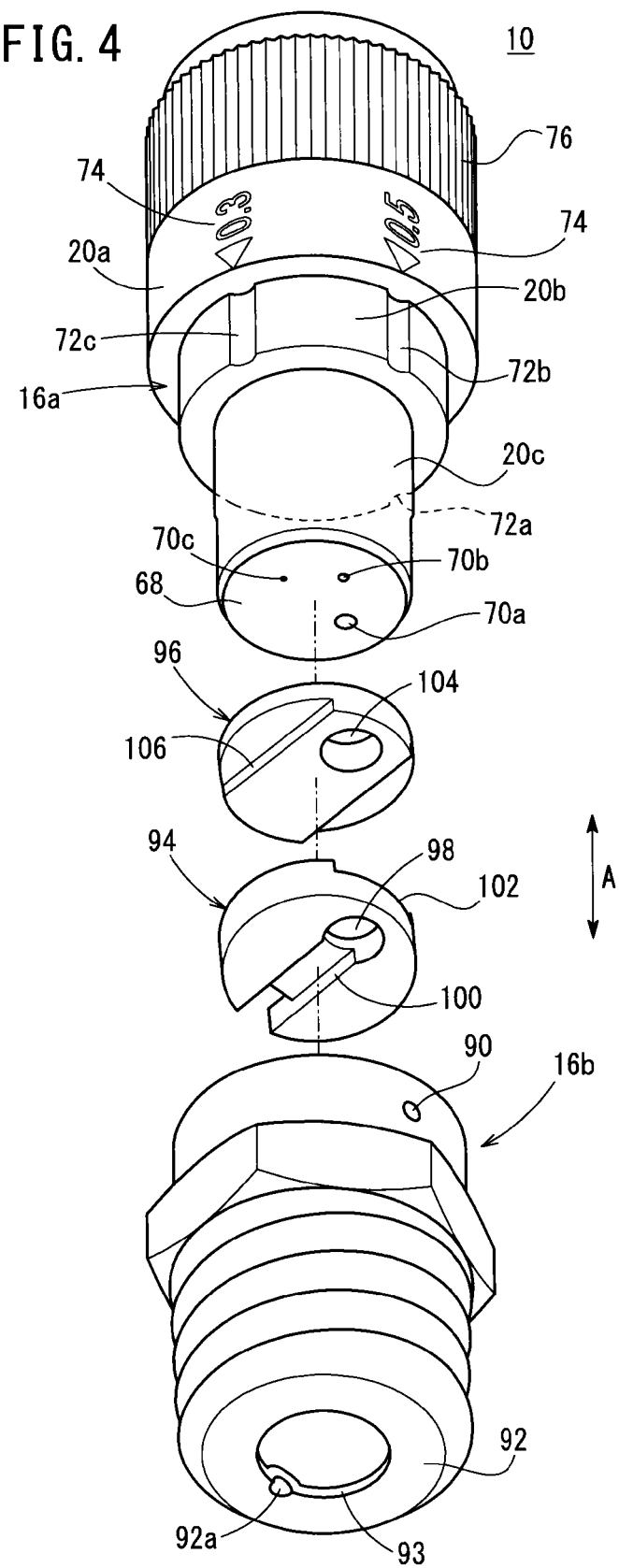
FIG. 4 is an exploded perspective view as seen from another direction of the pipe joint.

As shown in FIG. 4, on a bottom surface 68 of the bottomed cylindrical section 20c, orifices 70a, 70b, and 70c, the opening diameters of which differ respectively, are disposed on the same circumference and are separated from one another at each of predetermined angles. On the outer circumference of the intermediate cylindrical section 20b, grooves 72a, 72b, and 72c are formed to extend in the axial direction at positions corresponding to the angular positions of the orifices 70a, 70b, and 70c. On the outer circumference of the large diameter cylindrical section 20a, printed indications 74 are provided, which indicate the orifice diameters of the respective orifices 70a, 70b, and 70c, and a rotating gripping member 76 having a corrugated shape is formed thereon.

The metal body 16b, for example, is formed from a metal material such as stainless steel or the like, and has a substantially cylindrical shape. On a distal end in the axial direction (the direction of the arrow A) of the metal body 16b, threads 80 are provided, which are screw-engaged in a screw hole 78 of the fluid pressure device 14. A fastening nut 82, which is continuous with the threads 80, is formed on an outer circumferential part of the metal body 16b. The fastening nut 82, for example, is formed with a hexagonal shape in cross section, and is used when the connection is made to the screw hole 78 using a non-illustrated tool.

From one end side in the axial direction of the metal body 16b, a large diameter side opening 86a and a small diameter side opening 86b are formed coaxially, for insertion therein of the bottomed cylindrical section 20c and the intermediate cylindrical section 20b of the resin body 16a.

The bottomed cylindrical section 20c is fitted rotatably in the opening 86b, whereas the intermediate cylindrical section 20b is fitted rotatably in the opening 86a. A seal member 88 is disposed at a boundary site between the openings 86a, 86b.

On an outer circumferential part on one end in the axial direction of the metal body 16b, a projection 90 bulges (is crimped) inwardly. The projection 90 engages with any of the grooves 72a, 72b, or 72c, whereby any one of the orifices 70a, 70b, or 70c is arranged in a position to establish communication with the fluid pressure device 14.

On the other end side in the axial direction of the metal body 16b, an inner projection 92 is disposed, and an opening (hole) 93 is formed. The inner projection 92 has a ring-like shape, and a latching member 92a, which is crimped axially inward, is formed on a part of the inner projection 92.

Inside the metal body 16b, a passage member 94 and a gasket 96 are arranged respectively at positions between the inner projection 92 and the bottomed cylindrical section 20c of the resin body 16a. The passage member 94, for example, is formed from a resin material having a substantially circular plate-like shape, and a through hole 98 is disposed at a position offset from a central portion thereof. In the through hole 98, when the projection 90 engages with any one of the grooves 72a, 72b, or 72c, a corresponding one of the orifices 70a, 70b, or 70c is placed at a position to communicate with the fluid pressure device 14.

On one surface of the passage member 94, a groove 100 is formed, which is cutout in a diametrical direction of the passage member 94 from the through hole 98. The latching member 92a of the metal body 16b engages with the groove 100 and serves to retain the angular position of the through hole 98. Another groove 102, which extends in a diametrical direction, is formed on another surface of the passage member 94.

The gasket 96 has a substantially circular plate-like shape, and a through hole 104, which communicates with the through hole 98 of the passage member 94, is formed at a position offset from a central portion. The through holes 98 and 104 constitute a communicating portion by which the fluid tube 12 and the fluid pressure device 14 communicate. A projection 106, which extends in a diametrical direction, is provided on the gasket 96, and the projection 106 is fitted into the groove 102 of the passage member 94. Such fitted engagement enables relative positioning between the gasket 96 and the passage member 94 to be carried out.

Next, operations and advantages of the pipe joint 10 will be described below. The pipe joint 10 is placed beforehand in a state of being screw-engaged and fixed with respect to the fluid pressure device 14 (see FIG. 1).

Initially, the fluid tube 12 is inserted from the side of the first opening 28 into the through hole 64 of the release bush 42. At this time, since the fluid tube 12 is inserted through the interior of the packing member 36, the seal projection part 46 is placed in sliding contact with the outer circumferential surface of the fluid tube 12. Therefore, an airtight condition can reliably be maintained between the packing member 36 and the fluid tube 12.

On the other hand, one end of the chuck 38 is pressed and widened radially outward by the fluid tube 12, whereby the pawls 48 come into abutting contact with the outer circumferential surface of the fluid tube 12. Furthermore, upon insertion of the fluid tube 12, the distal end of the fluid tube 12 comes into abutment against the second stepped portion 34.

Next, when the fluid pressure device 14 is operated, a pressure fluid is supplied or discharged with respect to the fluid tube 12 that is connected to the pipe joint 10. For example, from the fluid tube 12, fluid is supplied to the interior of the resin body 16a of the pipe joint 10. After the supplied flow rate of the fluid is regulated by passing through one of the orifices 70a, 70b, or 70c that are disposed in the bottom surface 68 of the resin body 16a, the fluid is supplied to the fluid pressure device 14 from the through hole 98 and the opening 93.

Further, when fluid is discharged from the fluid pressure device 14 to the interior of the resin body 16a, the fluid is supplied to the orifice 70a, 70b, or 70c from the through hole 98. As a result, the fluid is discharged into the fluid tube 12 after the discharged flow rate thereof is regulated. Therefore, a velocity control (e.g., reciprocal velocity control of a piston) is accomplished in the fluid pressure device 14.

On the other hand, when the fluid tube 12 is separated from the pipe joint 10, the flange 62 of the release bush 42 is pressed toward the side of the resin body 16a. Therefore, the tapered part 60 presses the pawls 48 of the chuck 38, so that the pawls 48 are moved in a direction to separate away from the outer circumferential surface of the fluid tube 12.

Consequently, the other end of the chuck 38 is pressed forcibly in a radial outward direction by the release bush 42. Therefore, the pawls 48 that have pierced into the outer circumferential surface of the fluid tube 12 separate away from the outer circumferential surface of the fluid tube 12, and the latched state of the fluid tube 12 by the chuck 38 is released. In addition, by pulling the fluid tube 12 in a direction away from the resin body 16*a*, the fluid tube 12 is removed from the pipe joint 10.

In this case, by rotating the resin body 16*a*, any one of the orifices 70*a*, 70*b*, or 70*c*, which are of different opening diameters respectively, can be placed at a position (communicating portion) to communicate with the fluid pressure device 14. Therefore, various types of fluid pressure devices 14 can suitably be employed, and an improvement in versatility can easily be achieved.

In addition, the grooves 72*a*, 72*b*, and 72*c* are formed to extend in the axial direction on the outer circumference of the resin body 16*a*. On the other hand, on an outer circumferential part on one end side of the metal body 16*b*, the projection 90 is provided, which engages with one of the grooves 72*a*, 72*b*, and 72*c*. Consequently, the orifice 70*a*, 70*b*, or 70*c* can be held reliably at a predetermined angular position, and variations in the orifice diameter due to vibration or attachment and detachment of the fluid tube 12 can reliably be suppressed.

Furthermore, the orifices 70*a*, 70*b*, and 70*c*, which differ in opening diameter respectively, are disposed in the resin body 16*a*. Therefore, when the orifice diameter is to be changed, there is no need to exchange the resin body 16*a* itself, and such a change may be made simply by rotating the resin body 16*a*. Consequently, the operation to change the orifice diameter can be accomplished more easily and in a shorter time.

Further, on the outer circumference of the resin body 16*a*, printed indications 74 are provided, which indicate the orifice diameters of the respective orifices 70*a*, 70*b*, and 70*c*. As a result, under usage, the orifice diameter can be confirmed from the exterior, whereby operability is enhanced and accuracy is improved.

Figure 5:
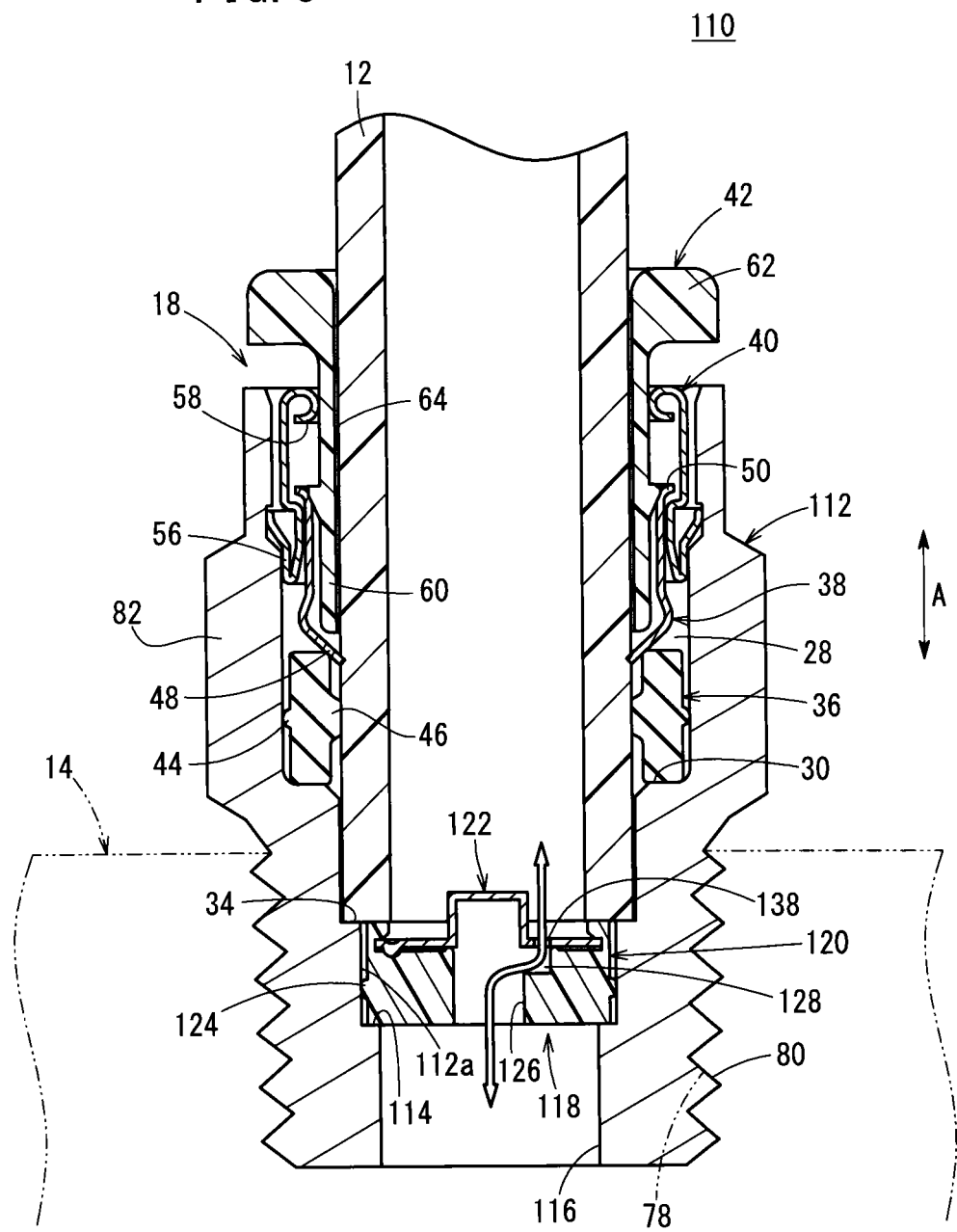
FIG. 5 is an overall vertical cross sectional view of a pipe joint according to a second embodiment of the present invention.

FIG. 5 is an overall vertical cross sectional view of a pipe joint 110 according to a second embodiment of the present invention. Constituent elements, which are the same as those in the pipe joint 10 according to the first embodiment, are denoted by the same reference characters, and detailed description thereof is omitted. Similarly, in the third and subsequent embodiments to be described below, constituent elements thereof, which are the same as those used in the previous embodiments, are denoted by the same reference characters, and detailed description of such features is omitted.

The pipe joint 110, for example, is formed from a metal material such as stainless steel or the like, and is equipped with a body 112 having a substantially cylindrical shape. The attachment/detachment mechanism 18 is incorporated in one end side, and threads 80 are provided on the other end side of the body 112. In the interior of the body 112, a first stepped portion 30, a second stepped portion 34, and a third stepped portion 114 are formed coaxially and with sequentially smaller diameters. On a downstream side of the third stepped portion 114, a communication hole (communicating portion) 116 is provided that communicates with the fluid pressure device 14.

Figure 6:
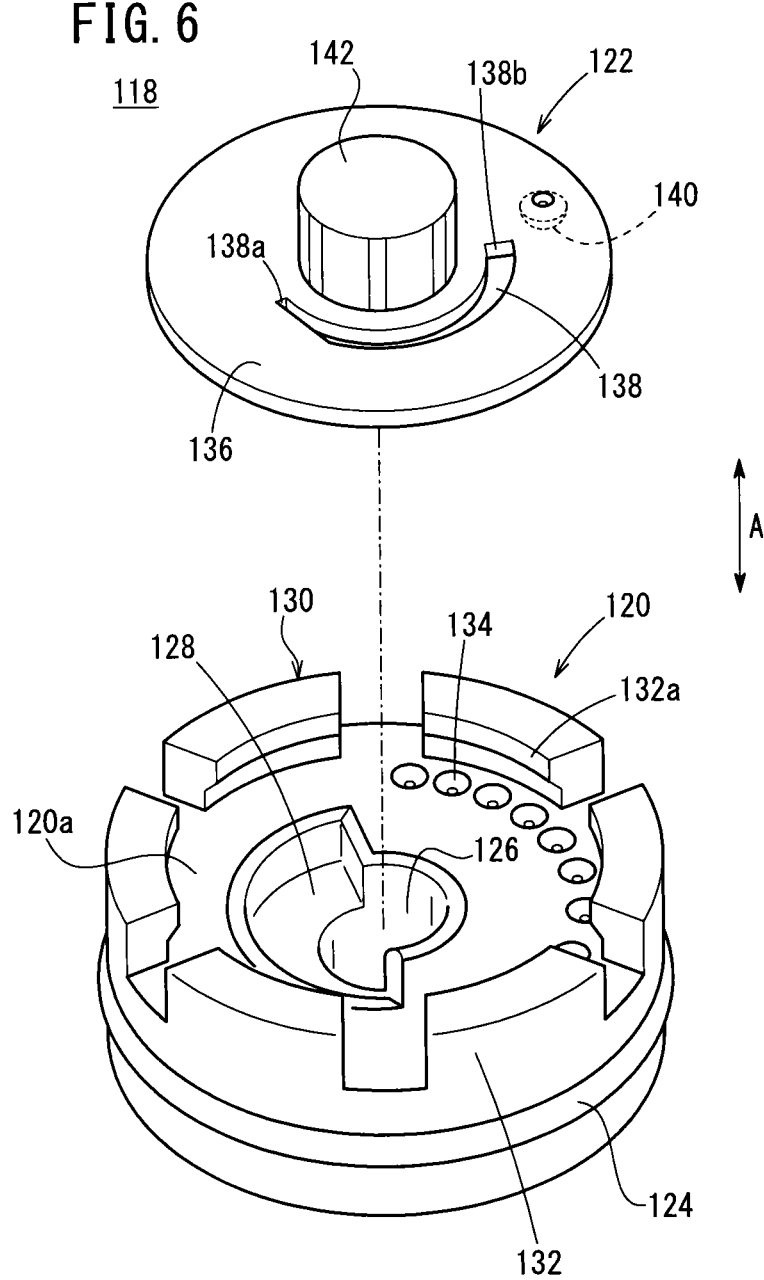
FIG. 6 is an exploded perspective view of an orifice part that makes up a portion of the pipe joint.

An orifice part 118 is arranged in the body 112, and is positioned between the distal end of the fluid tube 12 and the third stepped portion 114. As shown in FIGS. 5 and 6, the orifice part 118 is equipped with a substantially ring-shaped main body portion 120, which is formed from a resin material, and an orifice plate 122, which is formed from a metal material or a resin material and is engaged rotatably with the main body portion 120.

On the outer circumference of the main body portion 120, a projection 124 is formed in a bulging manner in sliding contact with an inner circumferential surface 112*a* between the second stepped portion 34 and the third stepped portion 114 of the body 112. In a central portion of the main body portion 120, a hole 126 is formed that communicates with the communication hole 116, and a passageway 128 is formed that communicates with an end on one end side (on the side of the fluid tube 12) of the hole 126.

The passageway 128 is formed by cutting out an end surface 120*a* of the main body portion 120, and is disposed at an offset position from the axial center position of the main body portion 120. A snap fitting 130 is formed on one end side on which the passageway 128 is disposed. The snap fitting 130 comprises a plurality of (e.g., six) pawls 132, which are disposed at equal angular intervals about the hole 126. On inner sides of the respective pawls 132, inwardly bulging latching members 132*a* are provided, which are elastically deformable in radial directions. Plural recesses (or projections) 134 are separated at predetermined intervals, respectively, on the end surface 120*a* of the main body portion 120, and are arranged along a circumference about the hole 126.

The orifice plate 122 includes a circular plate member 136, and on the circular plate member 136 there are provided an orifice 138, and a projection (or recess) 140 that projects toward the side of the end surface 120*a*. The orifice 138 is bent in an arcuate shape about a central portion of the circular plate member 136, and after the opening width dimension on the side of one end 138*a* is gradually expanded, a substantially constant opening width dimension is maintained continuing to the other end 138*b* of the orifice 138.

Figure 7:
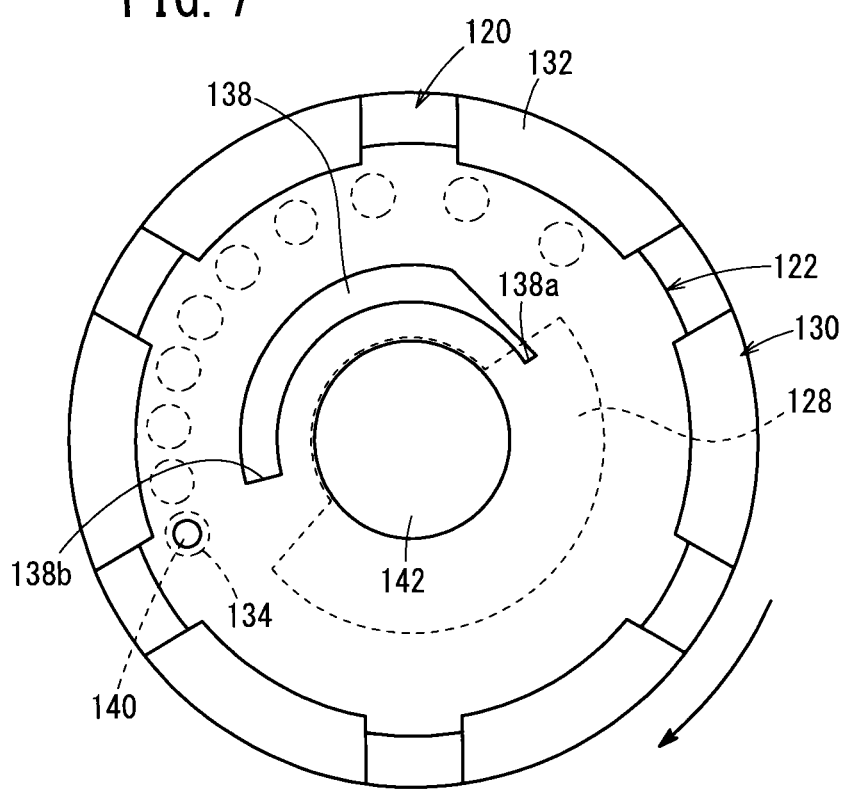
FIG. 7 is a schematic plan view of the orifice part.

When the projection 140 is placed in engagement sequentially with the respective recesses 134 of the end surface 120*a*, the cross sectional area of the orifice 138 that communicates with the passageway 128 can be adjusted sequentially to become gradually larger (see FIG. 7). When it abuts against the end surface 120*a*, the orifice plate 122 is engaged by the respective pawls 132 that make up the snap fitting 130, to thereby stop the orifice plate 122 from falling out.

With the second embodiment, as shown in FIG. 7, when the gripping member 142 is gripped and rotated in the direction of the arrow, the orifice plate 122, which is formed integrally with the gripping member 142, is rotated with respect to the main body portion 120. Additionally, the projection 140 provided on the circular plate member 136 is placed in engagement with an arbitrary one of the recesses 134 from among the plural recesses 134 provided on the main body portion 120. Therefore, the flow passage cross sectional area of the orifice 138 that communicates with the passageway 128 can be changed.

Accordingly, with the orifice part 118, a desired flow path cross sectional area can be adjusted. As a result, the same advantages of the aforementioned first embodiment can be obtained, in that various types of fluid pressure devices 14 can suitably be employed, and an improvement in versatility can easily be achieved.

Figure 8:
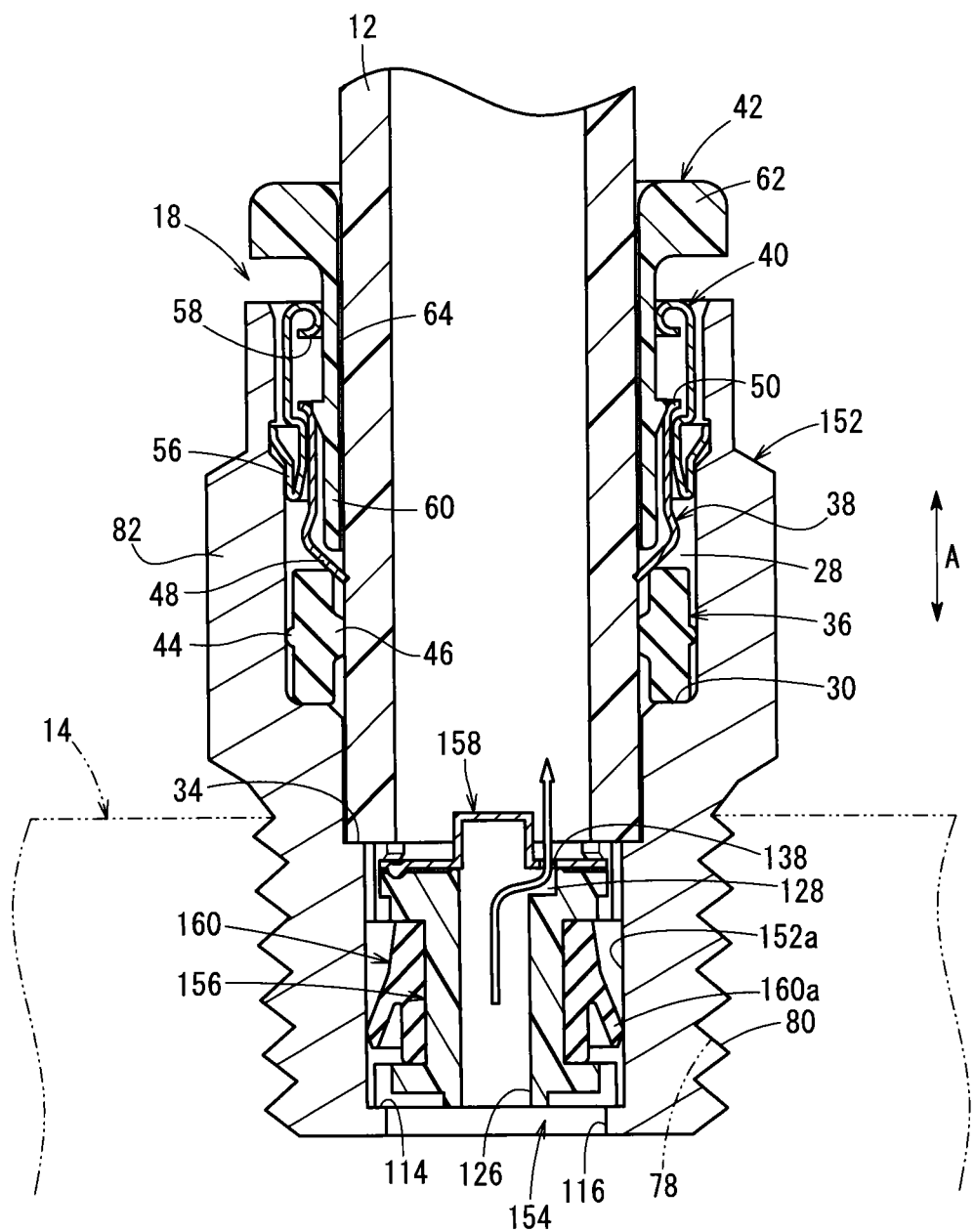
FIG. 8 is an overall vertical cross sectional view of a pipe joint according to a third embodiment of the present invention.

FIG. 8 is an overall vertical cross sectional view of a pipe joint 150 according to a third embodiment of the present invention. Constituent elements thereof, which are the same as those in the pipe joint 110 according to the second embodiment, are denoted by the same reference characters, and detailed description of such features is omitted.

The pipe joint 150, for example, is formed from a metal material such as stainless steel or the like, and is equipped with a body 152 having a substantially cylindrical shape. An orifice part 154 is arranged in the body 152 at a position between the distal end of the fluid tube 12 and the third stepped portion 114.

Figure 9:
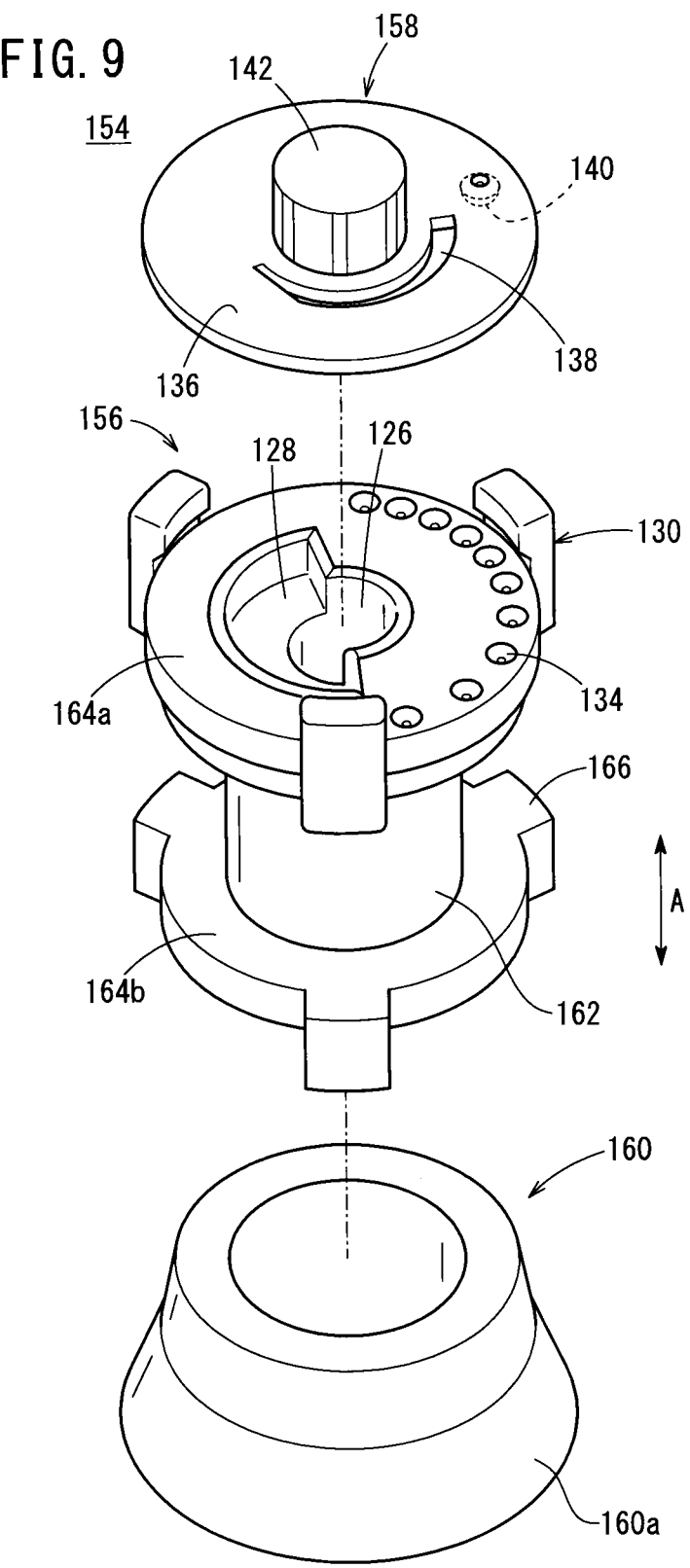
FIG. 9 is an exploded perspective view of an orifice part that makes up a portion of the pipe joint.

As shown in FIGS. 8 and 9, the orifice part 154 comprises a resin made main body portion 156, an orifice plate 158 made from a metal or resin, and a packing member 160 made of rubber.

The main body portion 156 is formed by circular plate members 164a, 164b that are formed integrally on opposite ends of a columnar member 162, with a hole 126 being formed in a central portion thereof. A passageway 128, a snap fitting 130, and a plurality of recesses (or projections) 134 are formed on the circular plate member 164a. Projections 166, which are separated respectively by a predetermined angular interval, are disposed to project outwardly on the outer circumference of the circular plate member 164b.

An orifice 138, a projection (or recess) 140 on the side of the main body portion 156, and a gripping member 142 are formed on the orifice plate 158. The packing member 160 comprises an inclined seal 160a, which expands in diameter and is inclined outwardly on the outer circumferential part of the packing member 160 from the second stepped portion 34 to the third stepped portion 114. The inclined seal 160a is in sliding contact with an inner circumferential surface 152a of the body 152.

With the third embodiment, when fluid is discharged from the fluid pressure device 14 to the interior of the body 152, as shown in FIG. 8, the fluid is introduced to the hole 126 of the main body portion 156 that makes up the orifice part 154. The hole 126 communicates with the passageway 128 of the circular plate member 164a, and from the passageway 128, the fluid passes through and is controlled only by the orifice 138, and then is discharged to the fluid tube 12.

Figure 10:
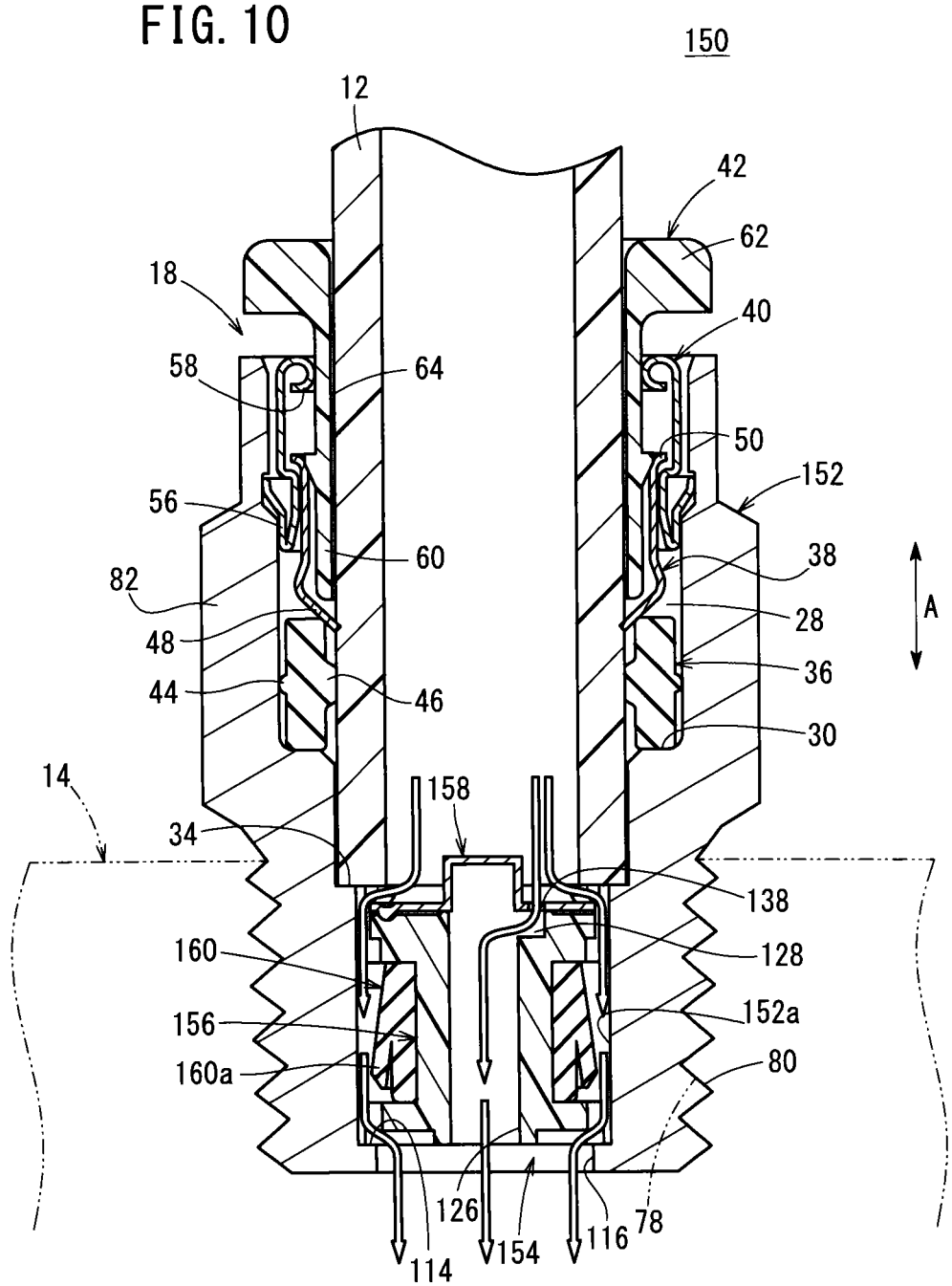
FIG. 10 is an explanatory illustration of operations of the pipe joint.

On the other hand, when fluid is supplied from the fluid tube 12 to the fluid pressure device 14, as shown in FIG. 10, the fluid is supplied along the fluid tube 12 to the orifice part 154. From the orifice 138, the fluid passes through the passageway 128 and the hole 126, and is supplied to the fluid pressure device 14. Furthermore, the residual fluid causes the inclined seal 160a of the packing member 160 to be reduced in diameter in the radial inward direction, passes between the outer circumference of the inclined seal 160a and the inner circumferential surface 152a, and is supplied (flows freely) to the fluid pressure device 14.

In this case, with the third embodiment, merely by rotating the orifice plate 158, the flow passage cross sectional area of the orifice part 154 can be adjusted. Consequently, the same advantages of the aforementioned first and second embodiments can be obtained, in that various types of fluid pressure devices 14 can suitably be employed, and an improvement in versatility can easily be achieved.

Figure 11:
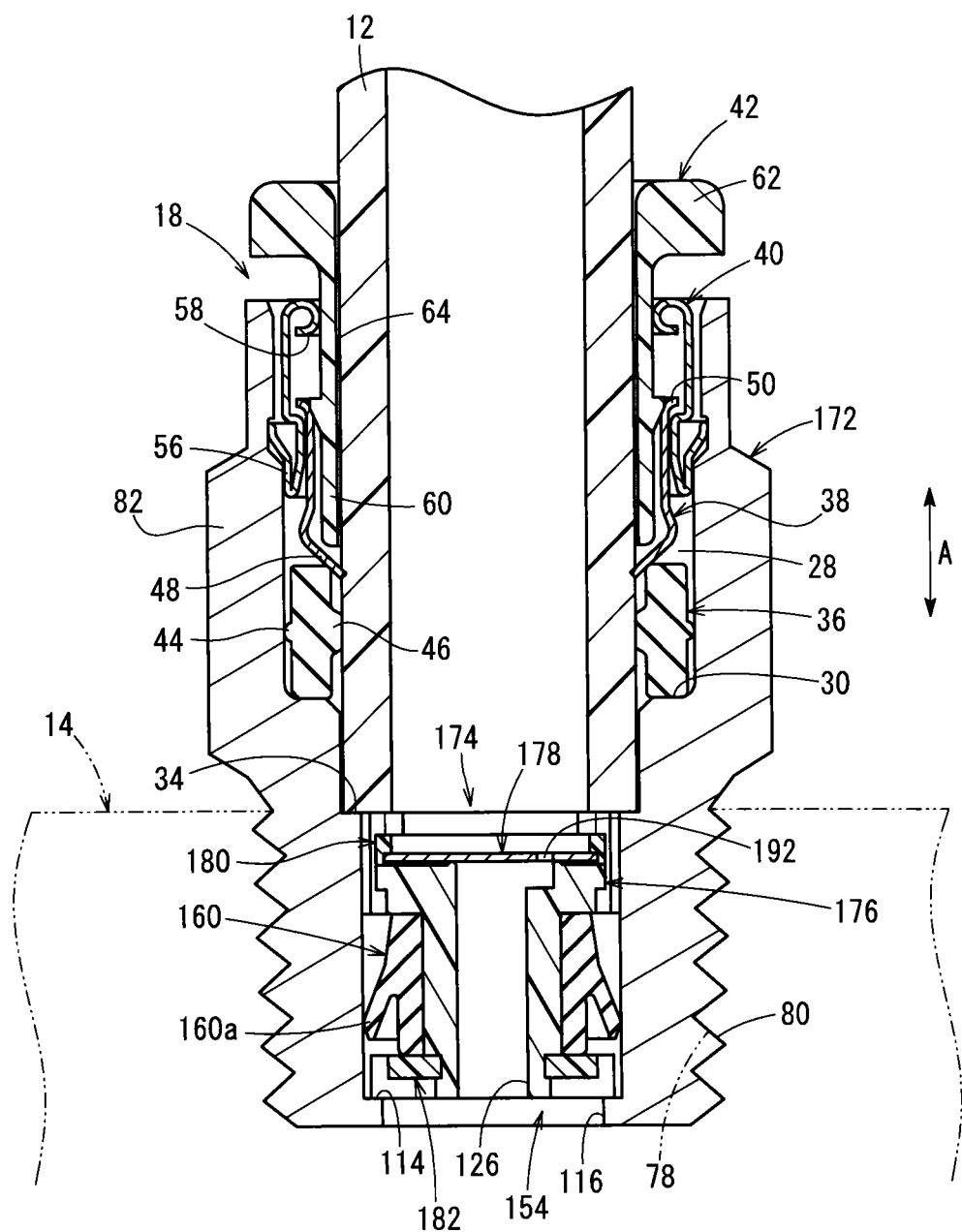
FIG. 11 is an overall vertical cross sectional view of a pipe joint according to a fourth embodiment of the present invention.

FIG. 11 is an overall vertical cross sectional view of a pipe joint 170 according to a fourth embodiment of the present invention.

The pipe joint 170, for example, is formed from a metal material such as stainless steel or the like, and is equipped with a body 172 having a substantially cylindrical shape. An orifice part 174 is arranged in the body 172 at a position between the third stepped portion 114 and the second stepped portion 34.

Figure 12:
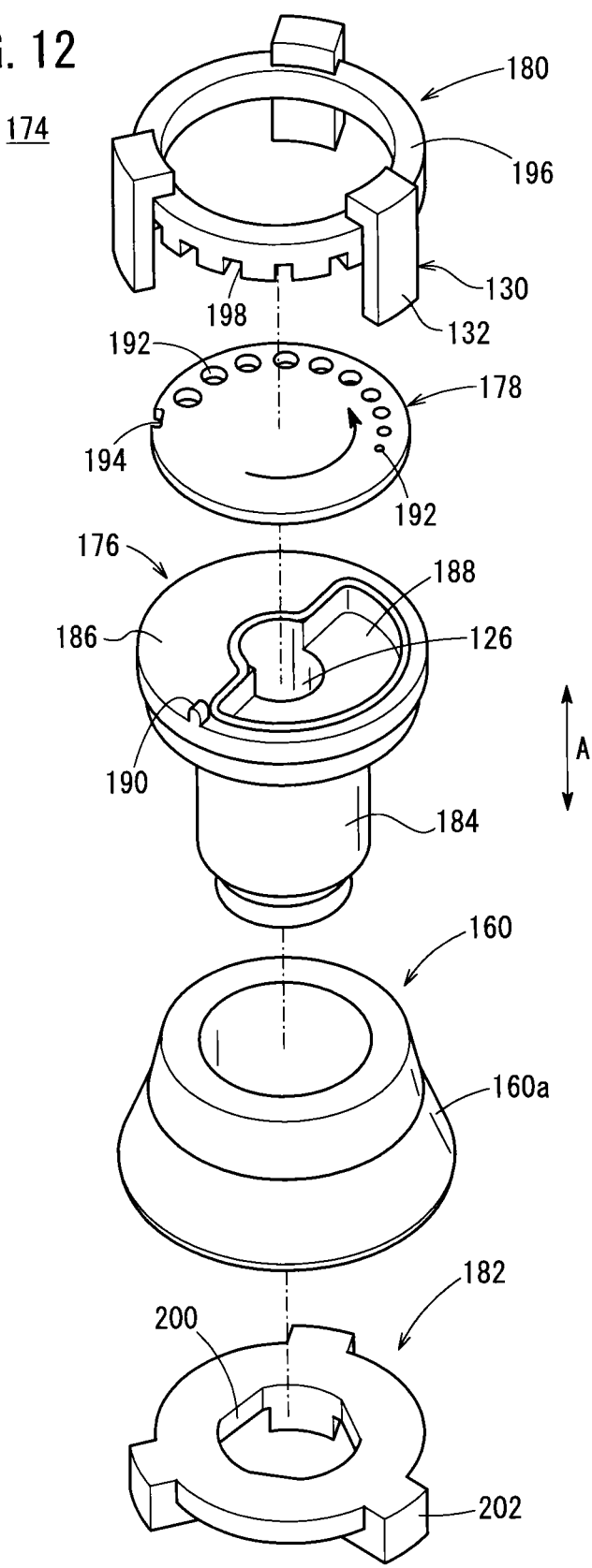
FIG. 12 is an exploded perspective view of an orifice part that makes up a portion of the pipe joint.

As shown in FIGS. 11 and 12, the orifice part 174 comprises a resin made main body portion 176, an orifice plate 178 made from a metal, a resin made rotating member 180, a packing member 160, and a bottom plate 182 made from a resin.

The main body portion 176 includes a columnar member 184 and a circular plate member 186 formed integrally with one end of the columnar member 184. On the circular plate member 186, a passageway 188 is formed that communicates with the hole 126 and opens in one direction in the surface of the circular plate member 186. A locking projection 190 is formed to bulge out on the outer circumferential edge of the circular plate member 186.

The orifice plate 178 has a disk-like shape, and on an outer circumferential edge thereof, multiple circular shaped orifices 192 are formed, each of which is separated by a predetermined distance along an imaginary circle. The orifices 192 are set to progressively larger opening dimensions along the direction of the arrow. A positioning groove 194 also is formed on an outer circumferential part of the orifice plate 178.

The rotating member 180 has a ring-shaped body 196, and on one side surface of the ring-shaped body 196, recesses 198 are disposed with a predetermined interval therebetween, to thereby form a serrated shape. A snap fitting 130 is constructed on the outer circumferential part of the ring-shaped body 196. The snap fitting 130, for example, includes three pawls 132. On the ring-shaped body 196, a projection (not shown) is provided, which is fitted into the groove 194 of the orifice plate 178 and retains the orifice plate 178 integrally on the ring-shaped body 196.

The bottom plate 182 has a substantially ring-like shape, and an opening 200, in which the columnar member 184 of the main body portion 176 is press-fitted, is formed in a central portion thereof. Three outwardly projecting projections 202, for example, are formed on an outer circumferential part of the bottom plate 182.

Figure 13:
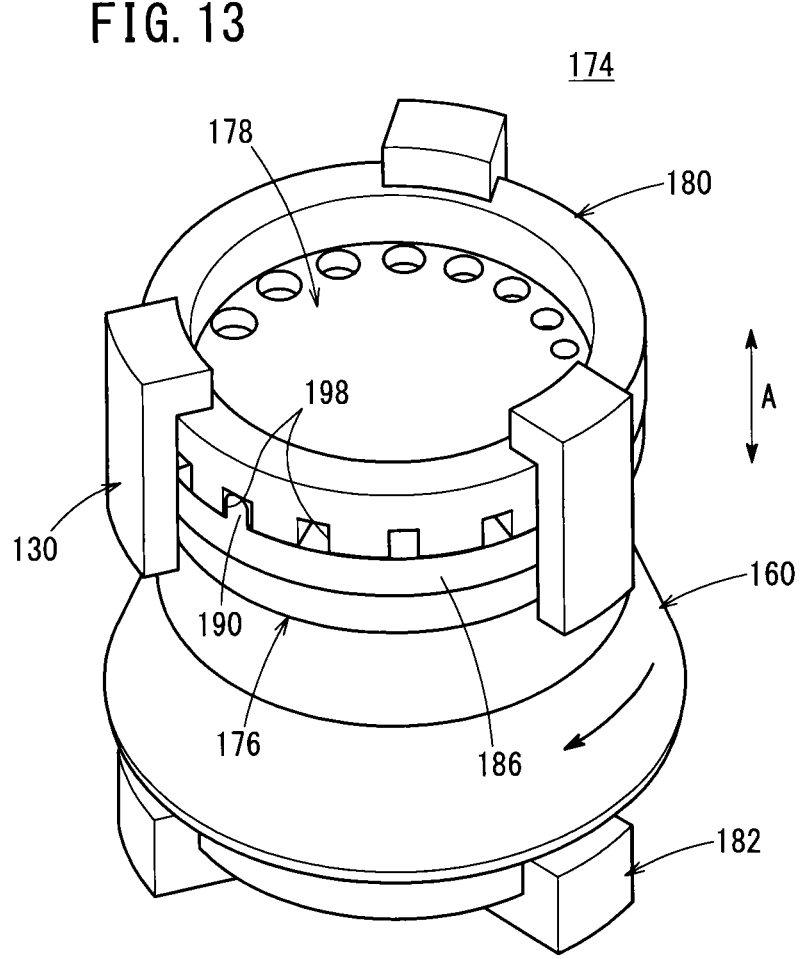
FIG. 13 is a schematic perspective view of the orifice part.

According to the fourth embodiment, as shown in FIG. 13, by engagement of the snap fitting 130 of the rotating member 180 with the circular plate member 186 of the main body portion 176, the main body portion 176, the orifice plate 178, and the rotating member 180 are held together integrally.

In addition, when the rotating member 180 is rotated in the direction of the arrow, the rotating member 180 and the orifice plate 178 are rotated together in unison in the direction of the arrow. Therefore, the projection 190 disengages from the recess 198 of the rotating member 180, and when the rotating member 180 is stopped at a predetermined angular position, the projection 190 is fitted into another one of the recesses 198. Consequently, a predetermined number of the orifices 192 are placed in communication with respect to the passageway 188, and the flow path cross sectional area in the orifice part 174 is adjusted.

As a result, the same advantages of the aforementioned first through third embodiments can be obtained, in that various types of fluid pressure devices 14 can suitably be employed, and an improvement in versatility can easily be achieved.

Figure 14:
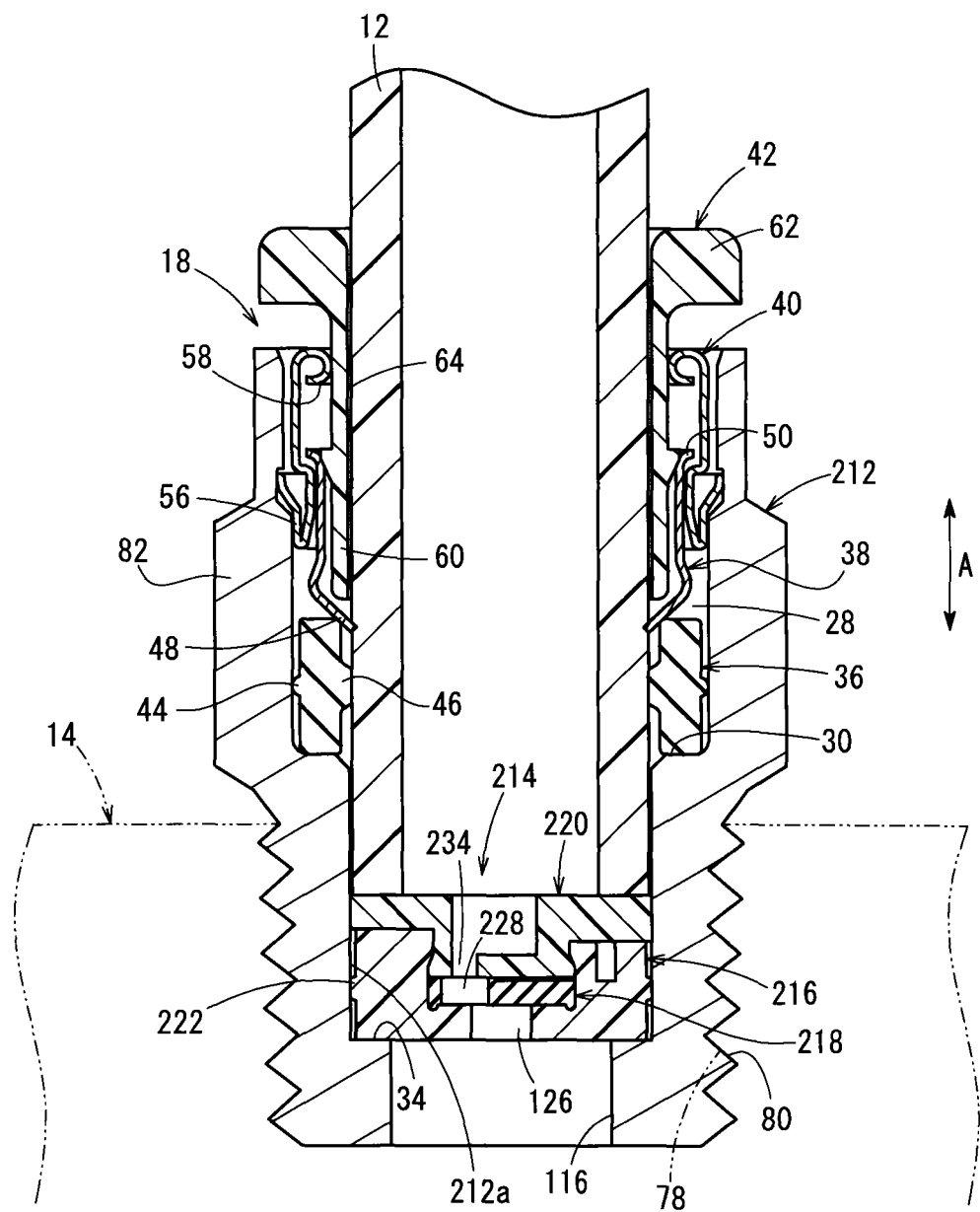
FIG. 14 is an overall vertical cross sectional view of a pipe joint according to a fifth embodiment of the present invention.

FIG. 14 is an overall vertical cross sectional view of a pipe joint 210 according to a fifth embodiment of the present invention.

The pipe joint 210, for example, is formed from a metal material such as stainless steel or the like, and is equipped with a body 212 having a substantially cylindrical shape. The first stepped portion 30 and the second stepped portion 34 are included in the interior of the body 212, but a third stepped portion is not provided. An orifice part 214 is arranged between the second stepped portion 34 and a distal end of the fluid tube 12.

Figure 15:
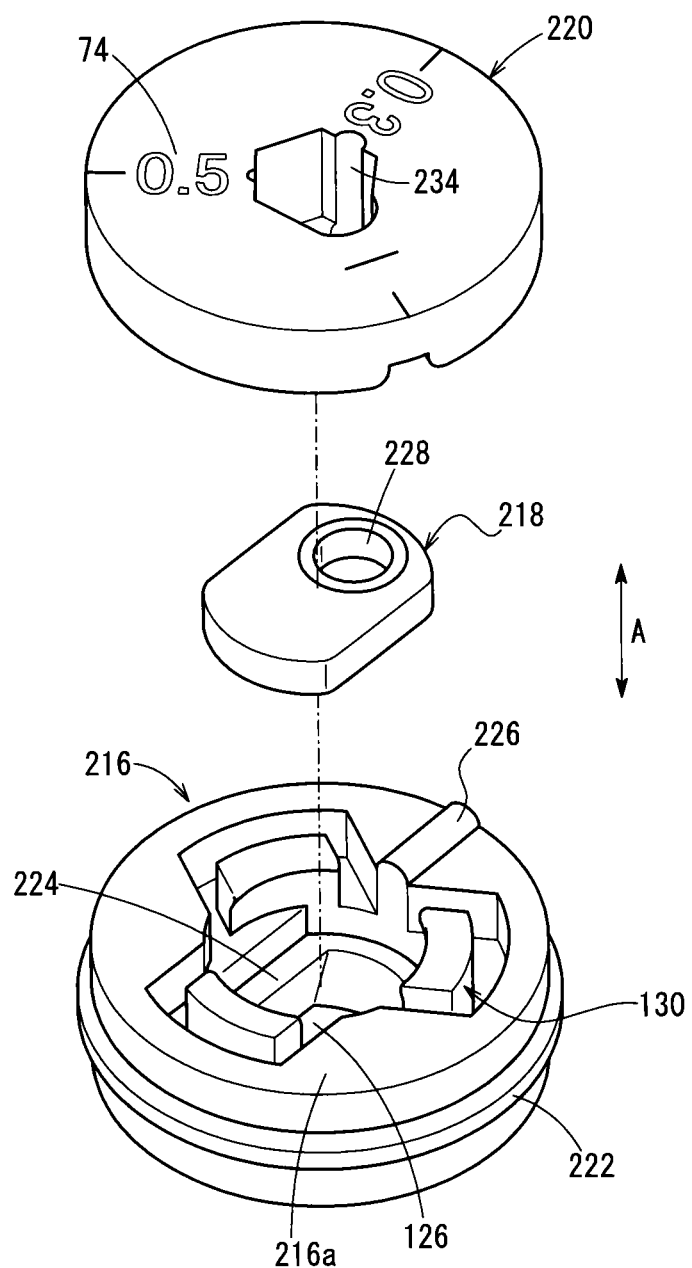
FIG. 15 is an exploded perspective view of an orifice part that makes up a portion of the pipe joint.

As shown in FIGS. 14 and 15, the orifice part 214 comprises a resin made main body portion 216, a rubber gasket 218, and a resin made orifice plate 220. The main body portion 216 has a substantially disk-like shape, with a projection 222, which is formed to bulge in sliding contact with the inner circumferential surface 212*a* of the body 212, being formed on an outer circumferential part of the main body portion 216.

On an end surface 216*a* of the main body portion 216, a passageway 224 that communicates with the hole 126 is disposed at a position offset from a central portion, and a latching member 226, which extends in a radial direction, is formed to bulge outwardly on the end surface 216*a*. A snap fitting 130, which is positioned from the interior substantially on the same plane as the end surface 216*a*, is disposed on the main body portion 216.

The gasket 218 is retained by the snap fitting 130, and a communication hole (communicating portion) 228 is formed therein at a position offset from a central portion.

Figure 16:
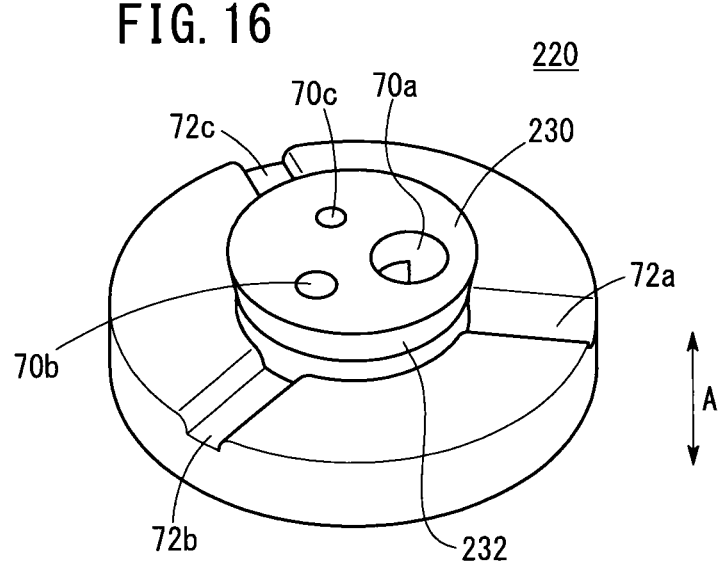
FIG. 16 is a schematic perspective view of an orifice plate that makes up a portion of the orifice part.

The orifice plate 220 has a substantially disk-like shape, and as shown in FIG. 16, is formed with a bulging portion 230, which bulges from a central portion thereof on a surface facing toward the main body portion 216. An inclined surface 232 that expands in diameter is formed on an outer circumferential surface of the bulging portion 230. By engagement of the inclined surface 232 with the snap fitting 130, a function is provided to prevent dislodgement during rotation.

Orifices 70*a*, 70*b*, and 70*c* are formed in the bulging portion 230. On the orifice plate 220, grooves 72*a*, 72*b*, and 72*c* are formed to extend in radial directions at positions corresponding to the orifices 70*a*, 70*b*, and 70*c*. The grooves 72*a*, 72*b*, and 72*c* engage with the latching member 226 of the main body portion 216, whereby the orifices 70*a*, 70*b*, and 70*c* can selectively be placed in communication with the hole 126 through a communication hole 228.

Printed indications 74 are provided on an outer surface of the orifice plate 220. In a central portion of the orifice plate 220, an engagement hole 234 is formed in which, for example, a hexagonal wrench (Allen wrench) or the like may be fitted.

According to the fifth embodiment, a tool is inserted into the engagement hole 234 of the orifice plate 220, and the orifice plate 220 is rotated to a predetermined position. More specifically, the groove 72*a*, 72*b*, or 72*c* is engaged with the latching member 226. Therefore, the orifice 70*a*, 70*b*, or 70*c* communicates through the communication hole 228 with the hole 126, and communication with the fluid pressure device 14 is established. Consequently, the same advantages of the aforementioned first through fourth embodiments can be obtained, in that various types of fluid pressure devices 14 can suitably be employed, and an improvement in versatility can easily be achieved.

Figure 17:
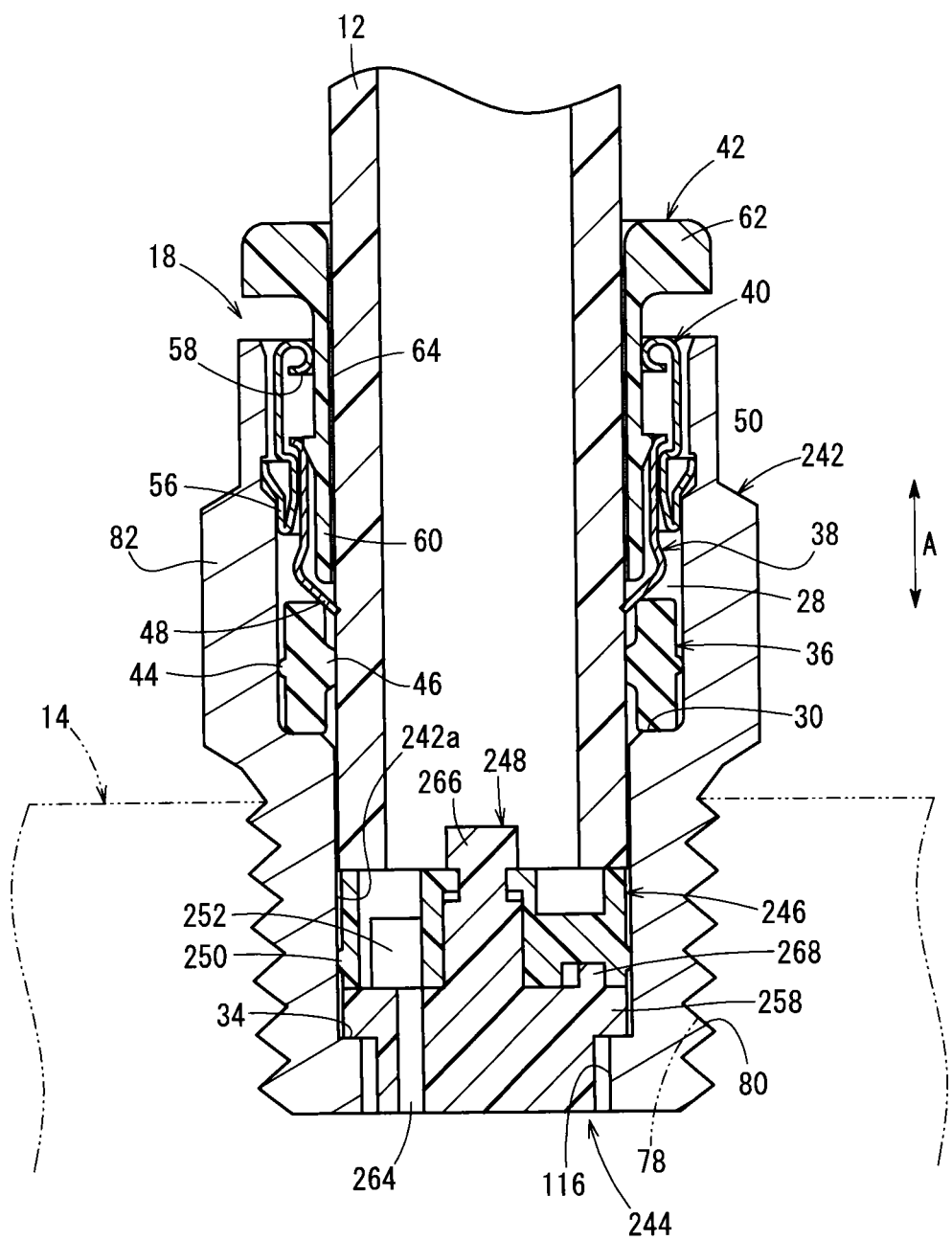
FIG. 17 is an overall vertical cross sectional view of a pipe joint according to a sixth embodiment of the present invention.

FIG. 17 is an overall vertical cross sectional view of a pipe joint 240 according to a sixth embodiment of the present invention.

The pipe joint 240, for example, is formed from a metal material such as stainless steel or the like, and is equipped with a body 242 having a substantially cylindrical shape. An orifice part 244 is arranged in the interior of the body 242 between the second stepped portion 34 and a distal end of the fluid tube 12.

Figure 18:
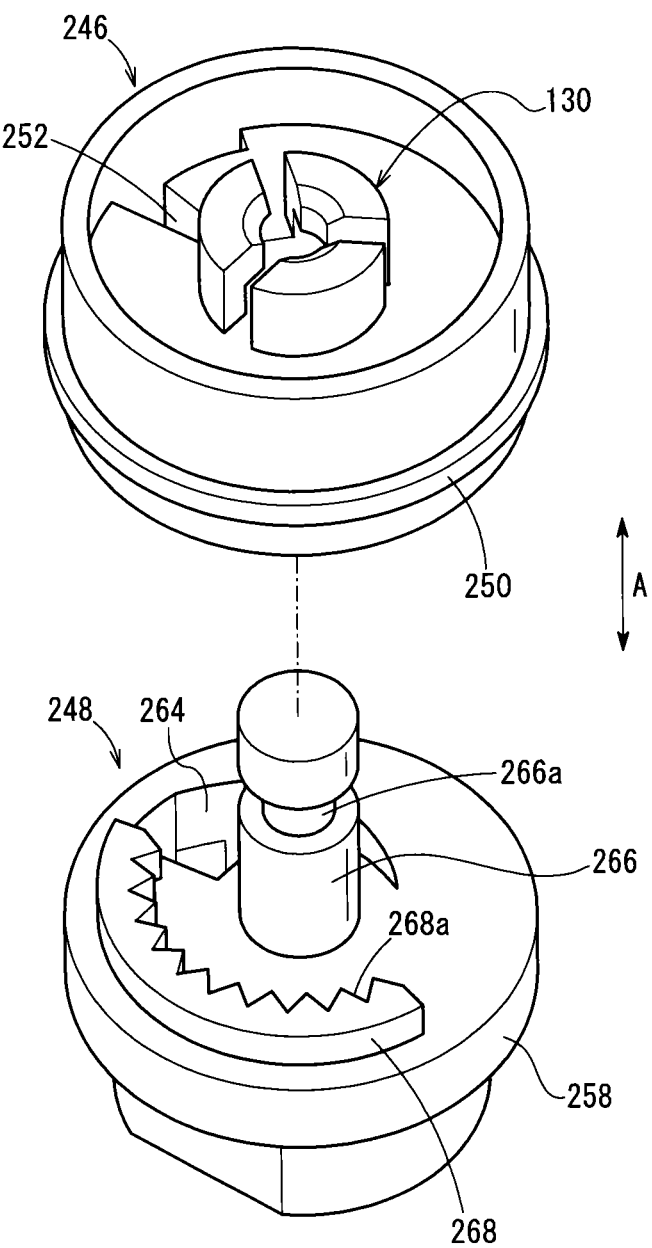
FIG. 18 is a perspective view as seen from one direction of an orifice part that makes up a portion of the pipe joint.
Figure 19:
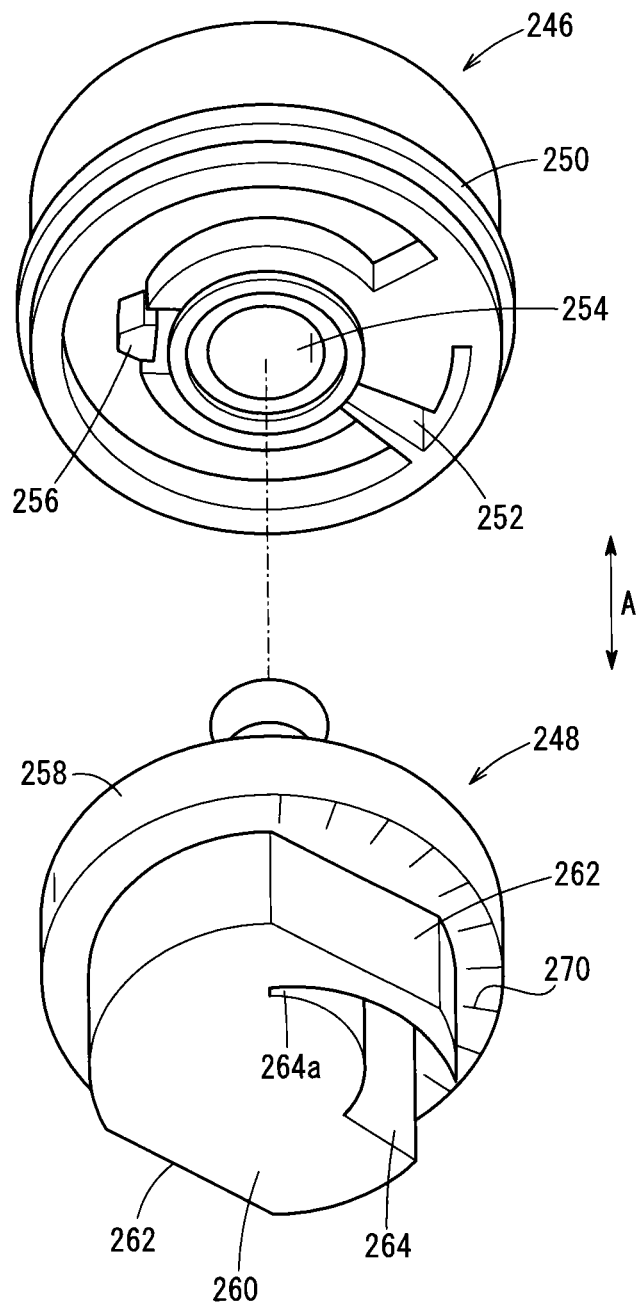
FIG. 19 is a perspective view as seen from another direction of the orifice part.

As shown in FIGS. 17 through 19, the orifice part 244 comprises a resin made main body portion 246 and a resin made orifice member 248. The main body portion 246 has a substantially disk-like shape, with a projection 250, which is formed to bulge in sliding contact with the inner circumferential surface 242*a* of the body 242, being formed on an outer circumferential part of the main body portion 246. A snap fitting 130 is disposed in a central portion of the body 242, and a passageway 252 is formed to penetrate at a position offset from a central portion.

As shown in FIG. 19, a hole 254 is provided in a surface of the main body portion 246 on an opposite side from the snap fitting 130, and a locking projection 256 is formed to bulge out therefrom.

The orifice member 248 includes a circular plate member 258, and a gripping member 260 is formed on one end side of the circular plate member 258. The gripping member 260 comprises flat surfaces 262 on both sides thereof. An orifice 264 is formed in the gripping member 260. The orifice 264 is of a shape in which the opening width dimension thereof increases continuously from one end 264*a* thereof.

As shown in FIG. 18, on a side surface opposite from the gripping member 260 of the orifice member 248, a rod 266 is formed to bulge out from a central portion, and a circumferential groove 266*a* is formed on an outer circumference of the rod 266. The snap fitting 130 is engageable with the circumferential groove 266*a*.

The orifice member 248 is bent in a substantially arcuate shape outwardly of the rod 266, and comprises an engagement part 268 having serrated corrugations 268*a* on an inner circumferential side thereof. A locking projection 256 is engageable with the corrugations 268*a*. A scale with graduations 270 is provided on the orifice member 248 outwardly of the gripping member 260.

According to the sixth embodiment, the orifice member 248 is rotated by the gripping member 260, whereby the locking projection 256 of the main body portion 246 engages with any of the corrugations 268*a* of the orifice member 248. In addition, when the orifice member 248 is stopped at a predetermined angular position, the overlapping state between the orifice 264 and the passageway 252 is adjusted, and therefore the cross sectional area of the flow path through the orifice part 244 can be adjusted. Accordingly, with the sixth embodiment, the same advantages as those of the above-described first through fifth embodiments can be obtained.

The pipe joint according to the present invention is not limited to the aforementioned respective embodiments, and it is a matter of course that various configurations could be adopted without deviating from the essence and gist of the present invention.

The invention claimed is:

1. A pipe joint that is connected to a fluid pressure device, comprising:
   a body in which a tube is inserted; and
   an attachment/detachment mechanism disposed in an interior of the body and which is configured to attach and detach the tube, wherein:
   the body includes
   a first body which is made of resin and in which the tube is inserted,
   a second body which is made of metal, connected to the fluid pressure device, and rotatable relatively with respect to the first body,
   the first body includes
   a large diameter cylindrical section in which the attachment/detachment mechanism is incorporated,
   an intermediate cylindrical section which is smaller in diameter than the large diameter cylindrical section, and into which a distal end of the tube is inserted through the large diameter cylindrical section, a bottomed cylindrical section which is smaller in diameter than the intermediate cylindrical section, the large diameter cylindrical section, the intermediate cylindrical section, and the bottomed cylindrical section are formed integrally in this order toward the second body, the bottomed cylindrical section and the intermediate cylindrical section are inserted into the second body, in the bottomed cylindrical section, an orifice part through which the tube and the fluid pressure device communicate is disposed rotatably, and disposed away from the tube and the attachment/detachment mechanism; and an opening dimension of an orifice of the orifice part that communicates with a communicating portion between the tube and the fluid pressure device is changed depending on a rotational angular position thereof, in the bottomed cylindrical section, a plurality of orifices the opening diameters of which differ from each other respectively, are disposed at equal intervals and have predetermined angles from one another respectively about a center of rotation of the first body, grooves are formed on an outer circumference of the intermediate cylindrical section at positions corresponding to angular positions of the orifices, a projection is formed on an inner circumference of the second body and maintains a plurality of specified angular positions of the first body and the second body by engaging with one of the grooves.

2. The pipe joint according to claim 1, wherein in the second body, a passage member is disposed including a through hole therein by which the orifices, which are arranged in specified angular positions, communicate with the fluid pressure device.

* * * * *